United States Patent [19]

Kang

[11] Patent Number: 5,745,447
[45] Date of Patent: Apr. 28, 1998

[54] THREE-AXIS MOVING ACTUATOR FOR OPTICAL PICK-UP

[75] Inventor: Seong-ho Kang, Seoul, Rep. of Korea

[73] Assignee: Samsung Electronics Co., Ltd., Kyungki-Do, Rep. of Korea

[21] Appl. No.: 663,532

[22] Filed: Jun. 13, 1996

[30] Foreign Application Priority Data

Jun. 15, 1995 [KR]  Rep. of Korea ............... 95-13565

[51] Int. Cl.[6] ........................................ G11B 07/00
[52] U.S. Cl. ............................... 369/44.15; 359/814
[58] Field of Search ........................ 369/44.14, 44.15, 369/44.22; 359/814, 824

[56] References Cited

U.S. PATENT DOCUMENTS

| | | | |
|---|---|---|---|
| 5,046,820 | 9/1991 | Saekusa et al. | 359/814 |
| 5,561,648 | 10/1996 | Song | 369/44.15 |
| 5,566,149 | 10/1996 | Song | 369/44.15 |
| 5,579,175 | 11/1996 | Kim et al. | 359/814 |

Primary Examiner—Mark Hellner
Attorney, Agent, or Firm—Sughrue, Mion, Zinn, Macpeak & Seas, PLLC

[57] ABSTRACT

A three-axis moving actuator for an optical pickup has a base, an object lens positioned on an optical axis, and a lens holder having two side planes parallel with a radial direction of a disk track and two side planes parallel with a tangential direction of the disk track. The object lens is fixed to the lens holder. A plurality of suspension members is provided for supporting the lens holder such that the lens holder is movable above the base. First and third magnets are installed on the base to face the two side planes parallel with the radial direction of the disk track, respectively, and second and fourth magnets are installed on the base to face the two side planes parallel with the tangential direction of the disk track, respectively. A focus coil is wound around the lens holder, and first to fourth tracking coil pairs are attached to the focus coil to face the first to fourth magnets, respectively.

11 Claims, 3 Drawing Sheets

THREE-AXIS MOVING ACTUATOR FOR OPTICAL PICK-UP

BACKGROUND OF THE INVENTION

The present invention relates to an actuator for an optical pickup and, more particularly, to a three-axis moving actuator for an optical pickup, which can move an object lens in three-axis directions.

Generally, an optical pickup records and/or plays back information on/from a recording medium, i.e., a disk in a non-contact manner, while moving radially across the disk.

This optical pickup includes an object lens for converging light emitted from a light source to a specific focal point on the disk. The object lens, installed in an actuator, moves in a tracking or focusing direction to produce a point of light of a predetermined diameter at a predetermined position on the disk.

FIG. 1 is a schematic perspective view of a conventional actuator for an optical pickup.

As shown, the conventional actuator for an optical pickup includes a base 11, a holder 13 fixed to the base 11, a bobbin 17 for fixing an object lens 15, a suspension 19 for linking the bobbin 17 to the holder 13, and a magnetic driving means for moving the bobbin 17 in a tracking or focusing direction.

The magnetic driving means has a focus coil 21 wound around the bobbin 17, tracking coils 23 attached to the focus coil 21, a pair of magnets 25a and 25b, a pair of outer yokes 27a and 27b installed on the base 11, for fixing the magnets 25a and 25b, respectively, and a pair of inner yokes 29a and 29b fixed to the base 11 between the focus coil 21 and the bobbin 17, for guiding the bobbin 17. The tracking coils 23 are attached to the focus coil 21 to face the respective magnets 25a and 25b.

In the conventional actuator for an optical pickup as constituted above, when a current is applied to the focus coil 21 and the tracking coils 23, a force is generated in a direction perpendicular to those of the applied current and a magnetic field of the magnets 25a and 25b, in accordance with Fleming's left-hand rule. This force moves the bobbin 17 and the object lens 15 in a tracking or Y-axis direction and a focusing or Z-axis direction. In this case, the movement of the object lens 15 is controlled by the directions and strengths of the currents applied to the focus coil 21 and the tracking coils 23.

The conventional actuator for an optical pickup, however, has no means for controlling the inclination of the disk nor means for compensating for errors in a tangential direction of a disk track.

For example, a general optical pickup for a low-density disk such as a compact disk (CD) produces a relatively large point of light, and thus the inclination of the disk and the errors in the tangential direction of the disk track are negligibly small. In contrast, for example, an optical pickup for a high-density disk such as a digital video disk (DVD) generates a small point of light on the disk, thereby leading to significant errors in the tangential direction of the disc. Hence, the conventional actuator cannot be used as the optical pickup for a high-density disk.

SUMMARY OF THE INVENTION

An object of the present invention is to provide a three-axis moving actuator for an optical pickup and which moves an object lens in a tangential direction of a disk track to control an error in the tangential direction of the disk track, as well as in the tracking and focusing directions.

To achieve the above object, there is provided a three-axis moving actuator for an optical pickup, comprising: a base; an object lens positioned on an optical axis; a lens holder having two side planes operative to be parallel with a radial direction of a disk track and two side planes operative to be parallel with a tangential direction of the disk track, the object lens being fixed to the lens holder; a plurality of suspension members for supporting the lens holder such that the lens holder is movable above the base; first and third magnets installed on the base to face the two side planes parallel with the radial direction of the disk track, respectively; second and fourth magnets installed on the base to face the two side planes parallel with the tangential direction of the disk track, respectively; a focus coil wound around the lens holder; and first to fourth tracking coil means attached to the focus coil and positioned to face the first to fourth magnets, respectively.

BRIEF DESCRIPTION OF THE DRAWINGS

The above object and advantages of the present is invention will become more apparent by describing in detail a preferred embodiment thereof with reference to the accompanying drawings, in which.

DETAILED DESCRIPTION OF THE INVENTION

Figure 1:
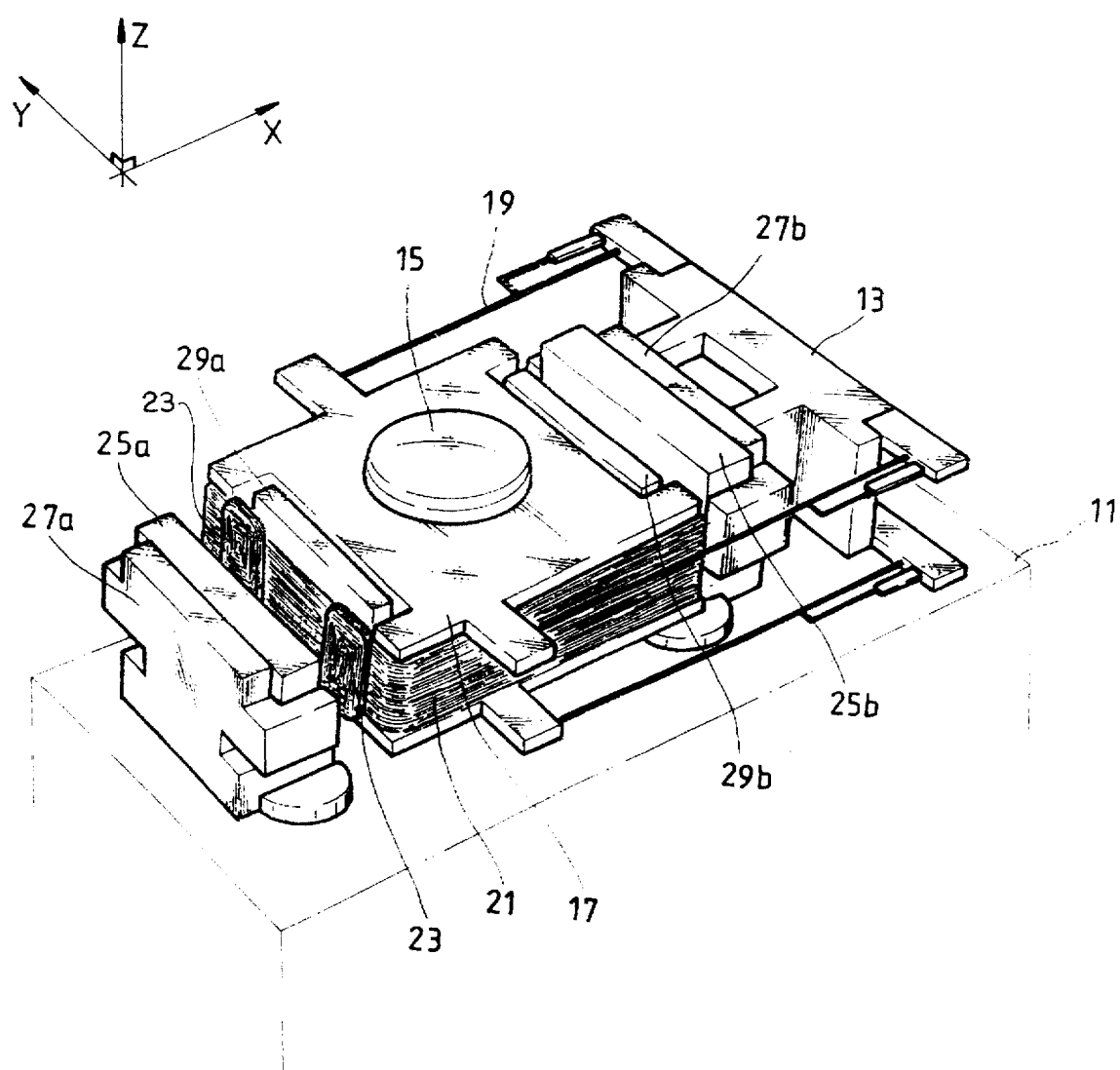
FIG. 1 is a schematic perspective view of a conventional actuator for an optical pickup.
Figure 2:
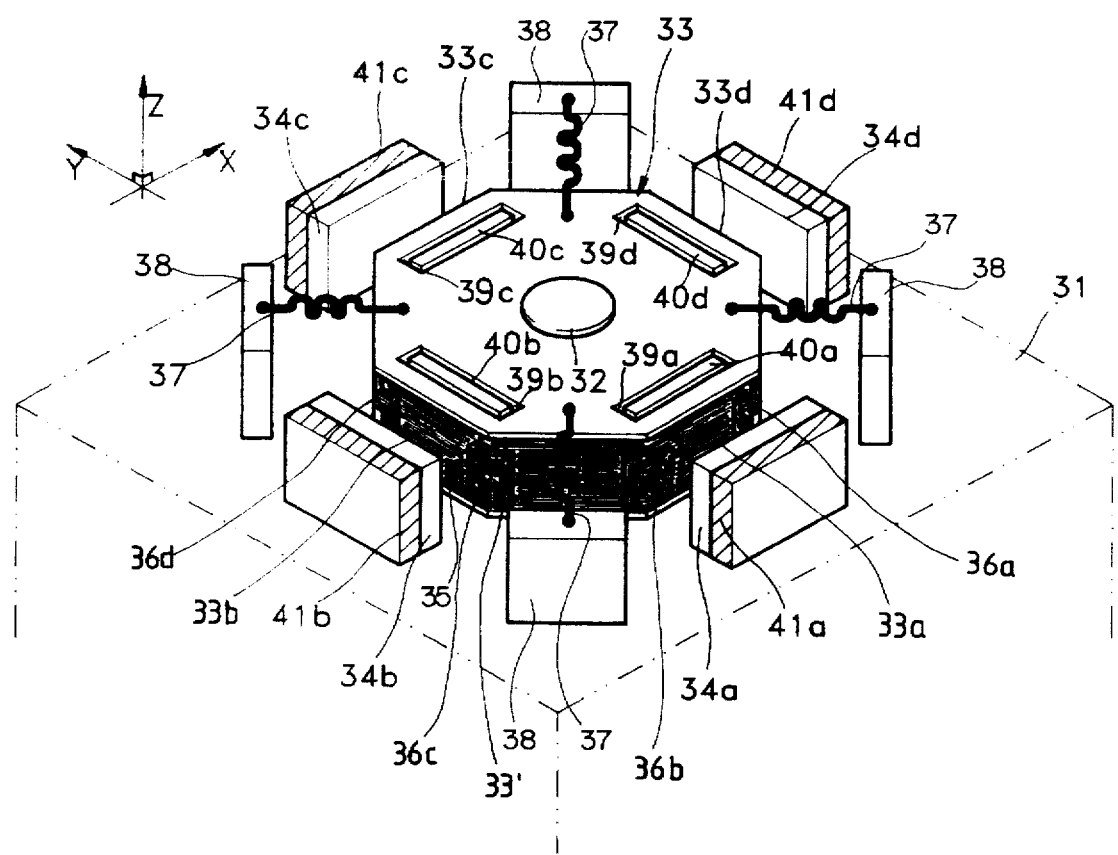
FIG. 2 is a schematic perspective view of a three-axis moving actuator for an optical pickup according to the present invention.
Figure 3:
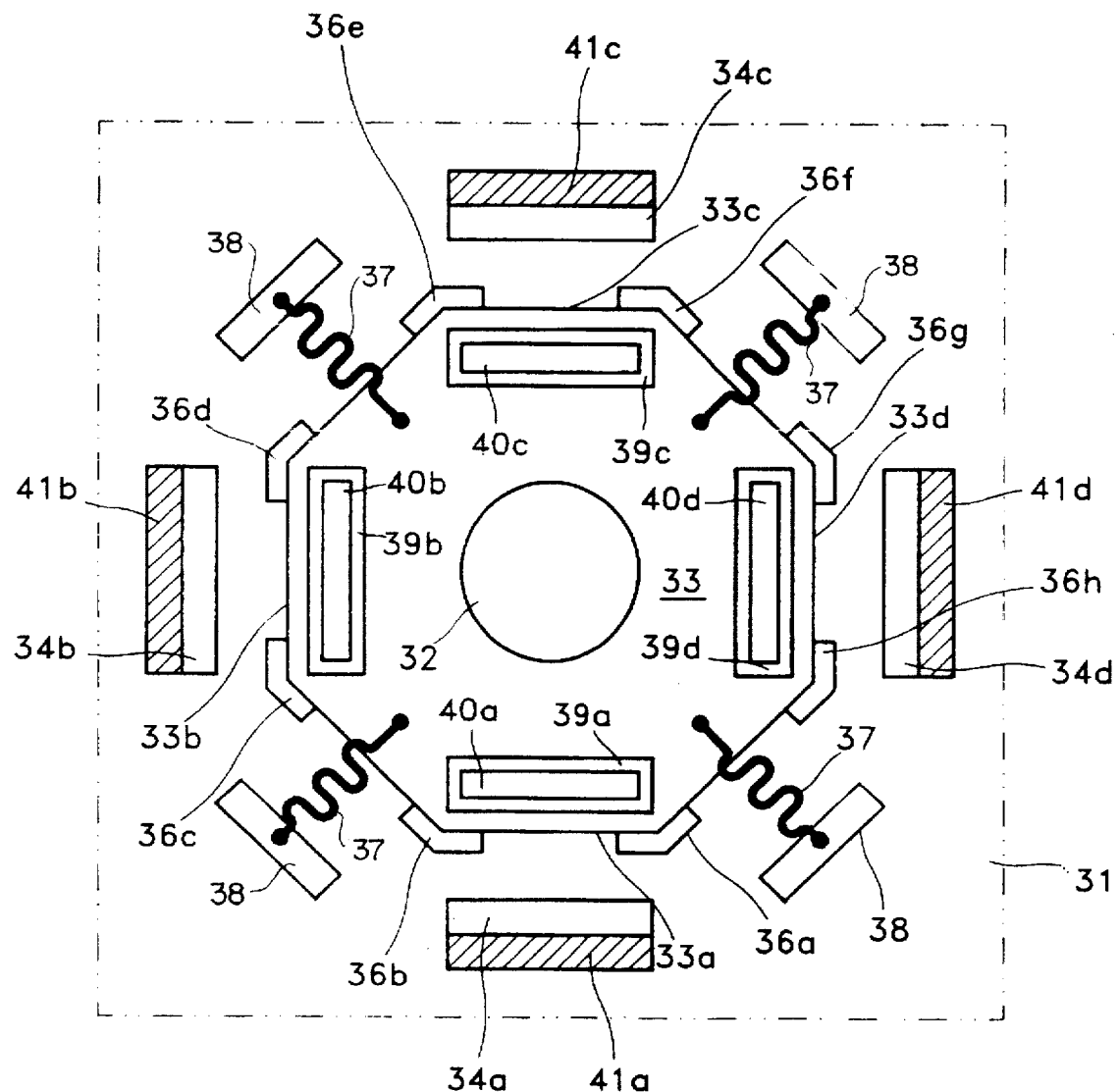
FIG. 3 is a plan view of the three-axis moving actuator for an optical pickup according to the present invention.

As shown in FIGS. 2 and 3, a three-axis moving actuator for an optical pickup according to the present invention has a base 31, a lens holder 33 having an object lens 32 mounted thereon and installed on the base 31, magnets 34a, 34b, 34c, and 34d installed at the base 31 around the lens holder 33, a focus coil 35 wound around the lens holder 33, a plurality of tracking coils 36a–36h attached to the focus coil 35, and a plurality of suspension members 37 for supporting the lens holder 33 such that the lens holder 33 is movable above the base 31.

The base 31 is mounted on a carriage (not shown) and moves in a radial direction (Y-axis) of a disk (not shown).

The object lens 32 is positioned on an optical axis and converges light emitted from a light source (not shown) of an optical pickup onto the disk.

The lens holder 33 can be an octangular pillar as shown in FIG. 2, a square pillar, or a cylinder, and has two side planes 33a and 33c parallel with a tangential direction of a disk track, i.e., an X-axis direction and two side planes 33b and 33d parallel with a radial direction of the disk, i.e., a Y-axis direction.

First and third magnets 34a and 34c are installed on the base 31 to face the side planes 33a and 33c of the lens holder 33, respectively, while second and fourth magnets 34b and 34d are installed on the base 31 to face the side planes 33b and 33d of the lens holder 33, respectively. Preferably, the magnets 34a–34d are permanent magnets. The south poles of the magnets 34a–34d face the lens holder 33 and the north poles face outward from the lens holder 33, or vice versa.

The focus coil 35 is wound around the side planes 33a–33d of the lens holder 33. Thus, the object lens 32 is moved upward and downward along a focusing direction, i.e., along a Z-axis, by the interaction between a current applied to the focus coil 35 and the magnets 34a–34d.

The lens holder 33 is moved along the X and Y-axes by the interaction between the magnets 34a–34d and a current flowing through the tracking coils 36a–36h. The tracking coils 36a–36h are installed in the boundary areas of the side planes 33a–33d where two side planes meet. Thus, four pairs of tracking coils, i.e., a first pair of tracking coils 36a and 36b, a second pair of tracking coils 36c and 36d, a third pair of tracking coils 36e and 36f, and a fourth pair of tracking coils 36g and 36h, are obtained. Each of the tracking coils 36a–36h is divided into two portions by a boundary line 33' between side planes 33a–33d of the lens holder 33. The current flows parallel with the optical axis through the two portions, and one of the two portions faces a corresponding magnet.

That is, each of the one portions of the first tracking coils 36a and 36b and third tracking coils 36e and 36f face the first and third magnets 34a and 34c, respectively, and move the lens holder 33 in the X-axis direction. Each of the one portions of the second tracking coils 36c and 36d and fourth tracking coils 36g and 36h face the second and fourth magnets 34b and 34d, respectively, and move the lens holder 33 in the Y-axis direction.

For example, currents flow in the same direction through the respective portions of the first tracking coils 36a and 36b, which face the first magnet 34a. If a current is applied counterclockwise to the tracking coil 36a, the current flows downward through the portion of the tracking coil 36a, which faces the first magnet 34a, i.e., the left portion. Here, the current is applied clockwise to the tracking coil 36b and thus the current flows downward through the portion of the tracking coil 36b, which faces the first magnet 34a, i.e., the right portion.

The current is applied to the second, third, and fourth tracking coils 36c and 36d, 36e and 36f, and 36g and 36h in the same manner as to the first tracking coils 36a and 36b. Therefore, since the directions of currents flowing through coil portions facing the magnets 34a–34d are identical, force is applied to the lens holder 33 in one direction.

Each of the suspension members 37 is formed of elastic material so as to serve as an elastically biasing member which is capable of stretching. One end of each suspension member 37 is fixed to the lens holder 33 and the other end thereof is fixed to support members 38 installed on the base 31.

Preferably, four through-holes 39a–39d may be formed on the upper surface of the lens holder 33 at the sides facing the magnets 34a–34d. There may be further provided a plurality of inner yoke members 40a–40d installed inside the through-holes 39a–39d, respectively, for guiding the lens holder 33. Also, outer yoke members 41a–41d may be further provided, which are attached to the rear or outer surfaces of the magnets 34a–34d to enable tight installation of the magnets 34a–34d on the base 31.

The above three-axis moving actuator for an optical pickup according to the present invention can move the object lens in the tangential direction of a disk track as well as in the tracking and focusing directions. Accordingly, focusing, tracking, and errors of the tangential direction can be corrected, which enables the actuator to be widely used as an optical pickup for high-density disks.

It is contemplated that numerous modifications may be made to the three-axis moving actuator for an optical pickup of the present invention without departing from the spirit and scope of the invention as defined in the following claims.

What is claimed is:

1. A three-axis moving actuator for an optical pickup, comprising:
   a base;
   an object lens positioned on an optical axis;
   a lens holder having two side planes operative to be parallel with a radial direction of a disk track and two side planes operative to be parallel with a tangential direction of the disk track, said object lens being fixed to said lens holder;
   a plurality of suspension members for supporting said lens holder such that said lens holder is movable above said base;
   first and third magnets installed on said base to face said two side planes parallel with the radial direction of the disk track, respectively;
   second and fourth magnets installed on said base to face said two side planes parallel with the tangential direction of the disk track, respectively;
   a focus coil wound around said lens holder; and
   first to fourth tracking coil means attached to said focus coil and positioned to face said first to fourth magnets, respectively.

2. The three-axis moving actuator for an optical pickup as claimed in claim 1, wherein each of said first to fourth tracking coil means comprises a pair of tracking coils spaced apart from each other, and wherein a part of each tracking coil is parallel with the optical axis and faces a corresponding one of said magnets, and currents flow through said part of each tracking coil in the same direction.

3. The three-axis moving actuator for an optical pickup as claimed in claim 2, wherein said pair of tracking coils of each of said first to fourth tracking coil means is wound into loops, and the current is applied clockwise to one of said pair of tracking coils, while the current is applied counterclockwise to the other of said pair of tracking coils.

4. The three-axis moving actuator for an optical pickup as claimed in claim 1, wherein said lens holder is octangular pillar-shaped.

5. The three-axis moving actuator for an optical pickup as claimed in claim 4, wherein each of said first to fourth tracking coil means comprises a pair of tracking coils wound into loops, each loop being divided into two parts by a boundary line between said side planes of said lens holder, and wherein one of said two parts faces a corresponding one of said magnets.

6. The three-axis moving actuator for an optical pickup as claimed in claim 5, wherein a current is applied clockwise to one of said pair of tracking coils and a current is applied counterclockwise to the other coil of said pair of tracking coils.

7. The three-axis moving actuator for an optical pickup as claimed in claim 1, wherein the north poles of said magnets face said lens holder.

8. The three-axis moving actuator for an optical pickup as claimed in claim 1, wherein the south poles of said magnets face said lens holder.

9. The three-axis moving actuator for an optical pickup as claimed in claim 1, wherein said suspension members are formed of elastic material, and one end of each of said suspension members is fixed to said lens holder and the other end thereof is fixed to a support member installed on said base.

10. The three-axis moving actuator for an optical pickup as claimed in claim 1, wherein four through-holes are formed on an upper surface of said lens holder at the sides facing said magnets, and further comprising a plurality of inner yoke members positioned inside said respective through-holes to guide said lens holder.

11. The three-axis moving actuator for an optical pickup as claimed in claim 1, further comprising a plurality of outer yoke members respectively attached to outer surfaces of said magnets to support said magnets on said base.

* * * * *